(12) United States Patent
Kim (10) Patent No.: US 8,750,672 B2
(45) Date of Patent: Jun. 10, 2014

(54) PLAYBACK METHOD AND APPARATUS

(75) Inventor: Kwang-min Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 12/207,817

(22) Filed: Sep. 10, 2008

(65) Prior Publication Data

US 2009/0220212 A1 Sep. 3, 2009

(30) Foreign Application Priority Data

Feb. 29, 2008 (KR) .................................. 2008-19318

(51) Int. Cl.
*H04N 9/80* (2006.01)
*H04N 5/92* (2006.01)

(52) U.S. Cl.
USPC .............. 386/68; 386/343; 386/344; 386/350

(58) Field of Classification Search
USPC .................................... 386/68, 343–344, 350
See application file for complete search history.

(56) References Cited

U.S. PATENT DOCUMENTS

| | | | |
|---|---|---|---|
| 5,477,397 A * | 12/1995 | Naimpally et al. | 386/230 |
| 6,363,207 B1 * | 3/2002 | Duruoz et al. | 386/200 |
| 7,159,231 B1 * | 1/2007 | Clark | 725/36 |
| 2003/0037330 A1 * | 2/2003 | Makofka | 725/32 |
| 2005/0265159 A1 | 12/2005 | Kanemaru et al. | |
| 2007/0025696 A1 | 2/2007 | Kim et al. | |
| 2009/0006771 A1 | 1/2009 | Freeman et al. | |

FOREIGN PATENT DOCUMENTS

| | | |
|---|---|---|
| CN | 1407798 | 4/2003 |
| GB | 2432987 A | 6/2007 |
| JP | 11-120705 | 4/1999 |
| JP | 2009-503760 A | 1/2009 |
| JP | 2009-505312 A | 2/2009 |
| JP | 2009-505327 A | 2/2009 |
| JP | 2010-532056 A | 9/2010 |
| KR | 2006-118274 | 11/2006 |
| KR | 2007-22578 | 2/2007 |
| WO | WO 01/15167 | 3/2001 |
| WO | WO 2007/018308 A1 | 2/2007 |
| WO | WO 2007/024078 A1 | 3/2007 |

OTHER PUBLICATIONS

Search Report and Written Opinion issued by International Searching Authority in International Patent Application no. PCT/KR2008/005441.
Extended in European Search report including European Search Opinion issued on Jul. 1, 2011, in counterpart European Patent Application No. 08872800.1 (7 pages, in English).
Second Office Action, dated Jul. 20, 2012, issued in counterpart Chinese Patent Application No. 200880127667.0; 9 pages including English translation.

(Continued)

*Primary Examiner* — Carl Colin
*Assistant Examiner* — John Elmore
(74) *Attorney, Agent, or Firm* — NSIP Law (57) ABSTRACT

A method and apparatus to simultaneously play back first media data and second media data according to a selected method while the first media data is being played back in a trick play mode, wherein the second media data is independent from the first media data.

19 Claims, 7 Drawing Sheets

(56) References Cited

OTHER PUBLICATIONS

Non-Final Rejection, dated May 30, 2012, issued in counterpart Korean Patent Application No. 10-2008-0019318; 7 pages including English translation.
Chinese Third Office mailed Nov. 5, 2012, issued in counterpart Chinese Patent Application No. 200880127667.0; 10 pages including English language translation.
Office Action dated Mar. 6, 2012, in counterpart Japanese Patent Application No. 2010-548598 and English Translation thereof.
Examination Report issued on Feb. 27, 2012, in counterpart European Patent Application No. 08872800.1 (in English).
Office Action dated Jan. 31, 2012, in counterpart Chinese Patent Application No. 200880127667.0.
European Office Action issued Apr. 26, 2013 in counterpart European Application No. 08 872 800.1 (4 pages in English).
Chinese Office Action mailed on Oct. 10, 2013 in the corresponding Chinese Application No. 200880127667.0 (11 pages, in Chinese, with complete English translation).

* cited by examiner

FIG. 2

PLAYBACK METHOD AND APPARATUS

CROSS-REFERENCE TO RELATED APPLICATION

This application claims the benefit of Korean Application No. 2008-19318, filed on Feb. 29, 2008 in the Korean Intellectual Property Office, the disclosure of which is incorporated herein by reference.

BACKGROUND OF THE INVENTION

1. Field of the Invention

Aspects of the present invention relate to a playback method and a playback apparatus, and more particularly, to a method and apparatus to play back another item of video data according to a method selected by a user when one item of video data is played back in a trick mode while a plurality of items of video data are being displayed on a single screen 2. Description of the Related Art With the development of digital technology, a variety of media data reproducing apparatuses (such as digital TVs, digital versatile disc (DVD) players, computers, etc.) have become widely used. Such apparatuses may reproduce media data (such as audio data, video data, or text data) by receiving the media data via a communications network from one or more servers that various contents providers (such as broadcasting stations and movie production companies) operate or by reading a recording medium that has video data, audio data, etc. recorded thereon.

Examples of the recording medium that stores the media data include a DVD, a blue-ray disc (BD), etc. With the development of high-density recording media, it has become possible to record large-capacity data onto a recording medium. Accordingly, a technique of reproducing two or more items of media data at the same time by using a single apparatus is being developed. The use of this technique allows users to view or listen to desired media data on a single screen or from a single speaker. When a user plays back one item of media data in a trick play mode (such as fast forwarding or slow play back of the media data) while using at least two items of media data, a problem still remains in terms of how to play back the residual media data.

SUMMARY OF THE INVENTION

Aspects of the present invention provide a method and apparatus to play back a plurality of items of media data, and a recording medium to record the playback method.

According to an aspect of the present invention, there is provided a method of simultaneously playing back first media data and second media data, independent from the first media data, the method including: playing back the second media data while the first media data is played back in a trick play mode.

In an aspect of the invention, the method may further include receiving a selection of a mode to be used to play back the second media data while the first media data is being played back in the trick play mode.

In an aspect of the invention, the playing back may include playing back the first media data by using a first clock signal output by a first system time clock (STC) counter, and playing back the second media data by using a second clock signal output by a second STC counter.

In an aspect of the invention, the playing back of the first media data may include depacketizing the first media data, and decoding the depacketized first media data by using the first clock signal.

In an aspect of the invention, the playing back of the second media data may include depacketizing the second media data, and decoding the depacketized second media data by using the second clock signal.

In an aspect of the invention, the second clock signal may be synchronized with the first clock signal from when a playback of the second media data starts.

In an aspect of the invention, the playing back may include playing back the second media data in the trick play mode in synchronization with a playback of the first media data in the trick play mode.

In an aspect of the invention, the playing back may include not outputting the second media data to a display unit while the first media data is being played back in the trick play mode.

In an aspect of the invention, the second clock signal may be independent from the first clock signal.

In an aspect of the invention, the playing back of the second media data may include playing back the second media data independently of the first media data.

In an aspect of the invention, the playing back may include preventing the second STC counter from outputting the second clock signal to prevent playback of the second media data while the first media data is being played back in the trick play mode.

In an aspect of the invention, the playing back may include: interrupting an output of the second media data to a display unit while the first media data is being played back in the trick play mode; and when the playback of the first media data in the trick play mode is concluded, playing back the second media data from a point of the second media data at which the output is interrupted.

In an aspect of the invention, the playing back may include: generating a still image from a point of the second media data that is being played back when the first media data starts to be played back in the trick play mode; playing back the still image while the first media data is being played back in the trick play mode; and starting to play back the second media data from the point of the second media data that is used to generate the still image when the playback of the first media data in the trick play mode is concluded.

According to another aspect of the present invention, there is provided an apparatus to simultaneously play back first media data and second media data, independent from the first media data, the apparatus including: a playback unit to play back the second media data while the first media data is being played back in a trick play mode.

According to another aspect of the present invention, there is provided a computer readable recording medium having recorded thereon a method of simultaneously playing back first media data and second media data, independent from the first media data, the method including: playing back the second media data while the first media data is being played back in a trick play mode.

According to another aspect of the present invention, there is provided a computer readable recording medium implemented by a reproducing apparatus to simultaneously play back a plurality of media data, the computer readable recording medium including: a first data packet comprising a first time stamp and first audio/video data, the first time stamp used by a first system time clock counter of the reproducing apparatus to decode the first audio/video data at a time indicated in the first time stamp; and a second data packet comprising a second time stamp and second audio/video data, the second time stamp used by a second system time clock counter of the reproducing apparatus to decode the second audio/video data at a time indicated in the second time stamp, wherein the reproducing apparatus plays back the second data packet while the first data packet is played back in a trick play mode by controlling the first system time clock counter and the second system time clock counter according to the first time stamp and the second time stamp, respectively.

According to another aspect of the present invention, there is provided an apparatus to simultaneously play back first media data and second media data, independent from the first media data, the apparatus including: a first system time clock (STC) counter to output a first clock signal in order to play back the first media data in a trick play mode; a second STC counter to output a second clock signal in order to play back the second media data; and a playback unit to play back the second media data while the first media data is played back in the trick play mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
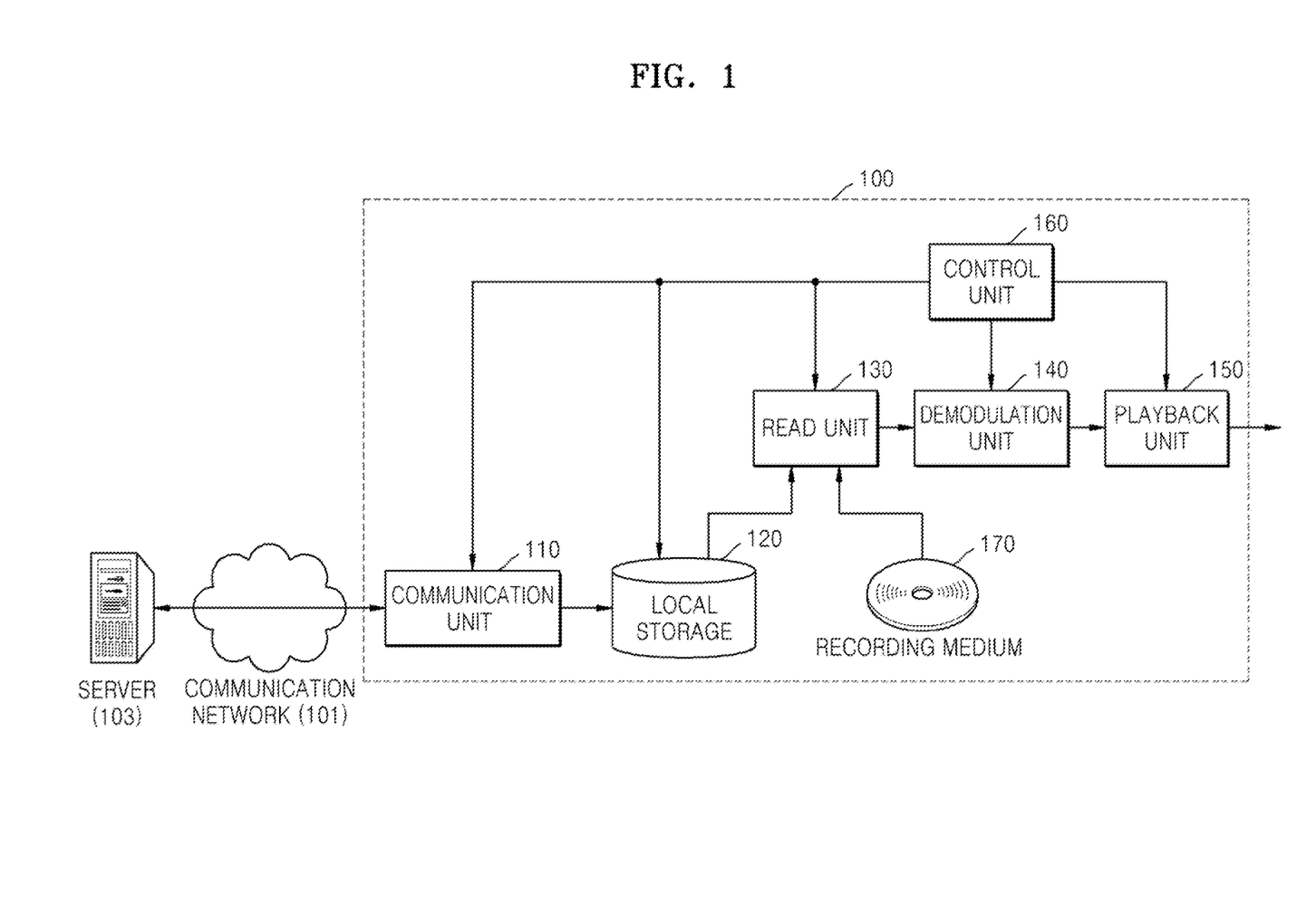
FIG. 1 is a block diagram of a decoding apparatus according to an embodiment of the present invention.

FIG. 1 is a block diagram of a decoding apparatus 100 according to an embodiment of the present invention. Referring to FIG. 1, the decoding apparatus 100 is connected to an external server 103 via a communications network 101. The decoding apparatus 100 plays back media data (such as audio data, video data, image data, text data, meta data, etc.) received from the external server 103 and/or plays back data read from a recording medium 170. Examples of the decoding apparatus 100 include a digital TV, a computer, a DVD player, a Blu-ray player, a video CD player, a digital video recorder (DVR), a mobile phone, a portable or non-portable multimedia player, etc. Although the decoding apparatus 100 may perform an operation of recording data to the recording medium 170, aspects of the present invention are not limited to this operation. For example, the decoding apparatus 100 may perform an operation of decoding and playing back data without the capability of recording data. The communications network 101 includes a wired and/or wireless communications network. The recording medium 170 can be an optical recording medium, a removable hard drive, an SD card, etc.

The external server 103 may be operated by a content provider (such as a broadcasting station, a movie manufacturing company, and a general contents generating company). Moreover, the external server 103 stores various types of media data (such as audio data, video data, text data, and/or meta data associated with the above-described data). Although FIG. 1 illustrates that the decoding apparatus 100 downloads data from the external server 103, the decoding apparatus 100 may download data from a database (not shown) instead of the external server 103 and store the data. In the context of a home network, the external server 103 can store the media in a user's library on a home computer, and connect through wired and/or wireless methods to the decoding apparatus 100.

The decoding apparatus 100 includes a communication unit 110, a local storage 120, a read unit 130, a demodulation unit 140, a playback unit 150, and a control unit 160. Although not shown in FIG. 1, the decoding apparatus 100 may further include a user interface and/or a recording unit to record data to the recording medium 170.

A user transmits a command to the control unit 160 through the user interface. The user interface may include a keyboard, a mouse, a touch screen, a remote control, and/or a physical transducer (such as a microphone), and receives a command, a character, a figure, and/or audio information from a user and informs the control unit 160 of the received command, character, figure, and/or audio information. According to aspects of the present invention, a user may command playback of first media data in a trick play mode through the user interface, and set a manner in which second media data is to be played back while the first media data is simultaneously being played back in the trick play mode.

The communication unit 110 is connected to the external server 103 or the database through the wired and/or wireless communications network 101 to send and/or receive information to/from the external server 103 or the database. When performing wireless communication, the communication unit 110 may include a wireless signal transceiving unit (not shown), a baseband processing unit (not shown), and a link control unit (not shown). The baseband processing unit (not shown) and the link control unit (not shown) are connected to the control unit 160 via a Host Control Interface (HCI) so as to send and receive an HCI packet to and from the control unit 160, thereby sending and receiving data and control commands to and from the control unit 160. The wireless communication method may use a wireless local area network (WLAN), Bluetooth, ZigBee, WiBro technology, etc.

The local storage 120 stores the information that the communication unit 110 has downloaded from the external server 103 or the database. Examples include the read unit 130 reads data from the local storage 120 or the recording medium 170 and sends the read-out data to the demodulation unit 140. The demodulation unit 140 demodulates the data read-out by the read unit 130 using a demodulation method corresponding to a modulation method performed by an encoding apparatus (not shown), in order to generate the demodulated data. When there are a plurality of items of media data, the demodulation unit 140 may separate the plurality of items of media data from one another to send each item of media data to the playback unit 150. For example, when the media data includes first media data and second media data, the demodulation unit 140 demodulates the first and second media data and sends the first and second media data to the playback unit 150. The playback unit 150 separately decodes the demodulated first and second media data, transforms the formats of the demodulated first and second media data into formats that can be output, and outputs signals containing the transformed first and second media data. The playback unit 150 may mix audio data and output the mixed audio data together with the signals containing the transformed first and second media data through a speaker. Alternatively or additionally, the playback unit 150 may blend video data and sub-data and output both the blended video data and sub-data on a single screen. The playback unit 150 may output the entire state of the decoding apparatus 100, information input by a user through a user interface, and/or other information through the screen or the speaker.

Although not shown in FIG. 1, the decoding apparatus 100 may decode and output media data by using a system time clock (STC) counter. An STC is a synchronization signal that serves as a basic element of a decoding apparatus. Each item of media data is decoded and played back at a predetermined point in time according to a clock signal output by the STC counter. If there exists a plurality of items of media data (for example, first media data and second media data as illustrated above), the first media data and the second media data may be output in synchronization with the clock signal output by a single STC counter. However, when the first and second media data are independent, the first and second media data are independently controlled and output according to clock signals output by corresponding first and second STC counters.

A user may set the manner in which the second media data is to be played back while the first media data is being played back in a trick play mode, by using the user interface. However, aspects of the present invention are not limited thereto. For example, according to other aspects, the decoding apparatus 100 may play back the second media data in a method predefined in the decoding apparatus 100 regardless of the control of a user, or as a default in a case where a user does not set the manner in which to play back the second media data. Also, while the first media data is being played back in the trick play mode, the second media data may be played back in the trick play mode in synchronization with the first media data or played back independently from the first media data. Moreover, while the first media data is being played back in the trick play mode, playback of the second media data may be interrupted for a short period of time. The decoding of media data using an STC counter will be described in greater detail with reference to FIGS. 2 and 3.

The control unit 160 controls operations of the decoding apparatus 100 so that a playback method according to aspects of the present invention can be performed. The control unit 160 includes an arithmetic logic unit (ALU) to perform calculations, and a register to temporarily store data and command words. When the first media data is played back in the trick play mode, the control unit 160 plays back the second media data according to a selection of a user and/or according to a method predefined in the decoding apparatus 100. For example, if the second media data is pre-set to be played back in the trick play mode while the first media data is being played back in the trick play mode, the control unit 160 determines whether the first media data is played back in the trick play mode. When playback of the first media data in the trick play mode is selected, the control unit 160 synchronizes an STC counter to provide a clock signal to the first media data with an STC counter to provide a clock signal to the second media data. When the second media data is selected to be played back independently from the first media data while the first media data is being played back in the trick play mode, the control unit 160 independently decodes the first media data and the second media data by using the respective STC counters for providing clock signals to the first and second media data. When the second media data is selected to not be played back while the first media data is being played back in the trick play mode, the control unit 160 controls the STC counter to provide a clock signal to the second media data to not operate. In this case, the STC counter to provide a clock signal to the second media data generates no clock signals until the playback of the first media data in the trick play mode is concluded. Accordingly, the second media data is neither decoded nor played back. While not required, the control unit 160 can be implemented as one or more processors and/or as a computer.

Figure 2:
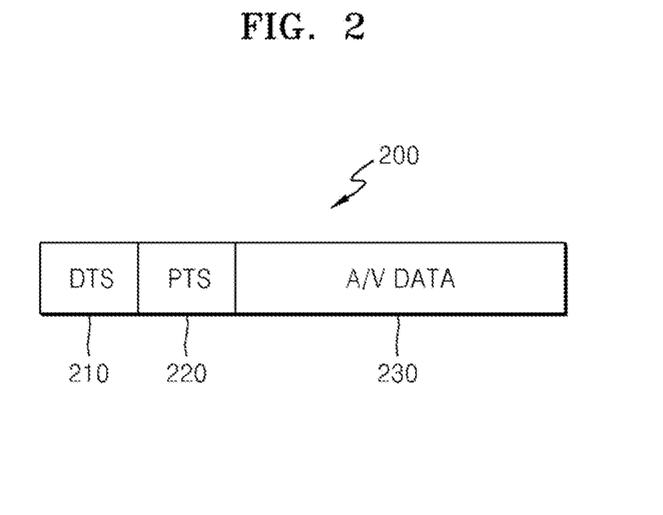
FIG. 2 illustrates a structure of a data packet according to an embodiment of the present invention.

FIG. 2 illustrates a structure of a data packet 200 according to an embodiment of the present invention. Referring to FIG. 2, the data packet 200 includes a decoding time stamp (DTS) 210, a presentation time stamp (PTS) 220, and AV data 230.

Since the amount of video data and/or audio data that is recorded in a recording medium 100 or transmitted via the server 130 may be large, time-space compression is performed on the video data and/or audio data before recording. The video data and/or audio data is divided into bitstreams having predetermined lengths called packets. Furthermore, the bitstreams are mixed with additional information (such as a header and so on), and the mixed bitstreams are transmitted according to time division multiplexing (TDM). Time information (i.e., a time stamp) may be added to each item of data so that the data item is synchronized with other items of data. The time stamp is a type of time management tag that is attached to each item of data being accessed in order to perform decoding during playback. Specifically, the time stamp is information representing a time when a unit in which video data and audio data is played back (i.e., a unit in which video data and audio data are accessed) is to be decoded and played back. As shown in FIG. 2, each data packet includes the PTS 220 and the DTS 210. When an STC generated in a decoding apparatus is consistent with the PTS 220, the PTS 220 is part of time management information for use in playing back the item of data being accessed.

In the context of MPEG type video, since intraframe (I) pictures and prediction frame (P) pictures of video data are emitted as encoding bitstreams prior to bi-directional prediction frame (B) pictures, a sequence in which the video data is decoded is different from a sequence in which the video data is played back and output. Accordingly, video data has the DTS 210 apart from the PTS 220 at which data is output. When the PTS 220 and the DTS 210 of video data have different values, the PTS 220 and the DTS 210 are consecutively included in the data packet of the video data. On the other hand, when the PTS 220 and the DTS 210 of the video data have identical values, only the PTS 220 is included in the data packet of the video data. The decoding apparatus 100 decodes and outputs the AV data 230 at a certain point in time according to the DTS 210 and the PTS 220 that are included in the media data.

Figure 3:
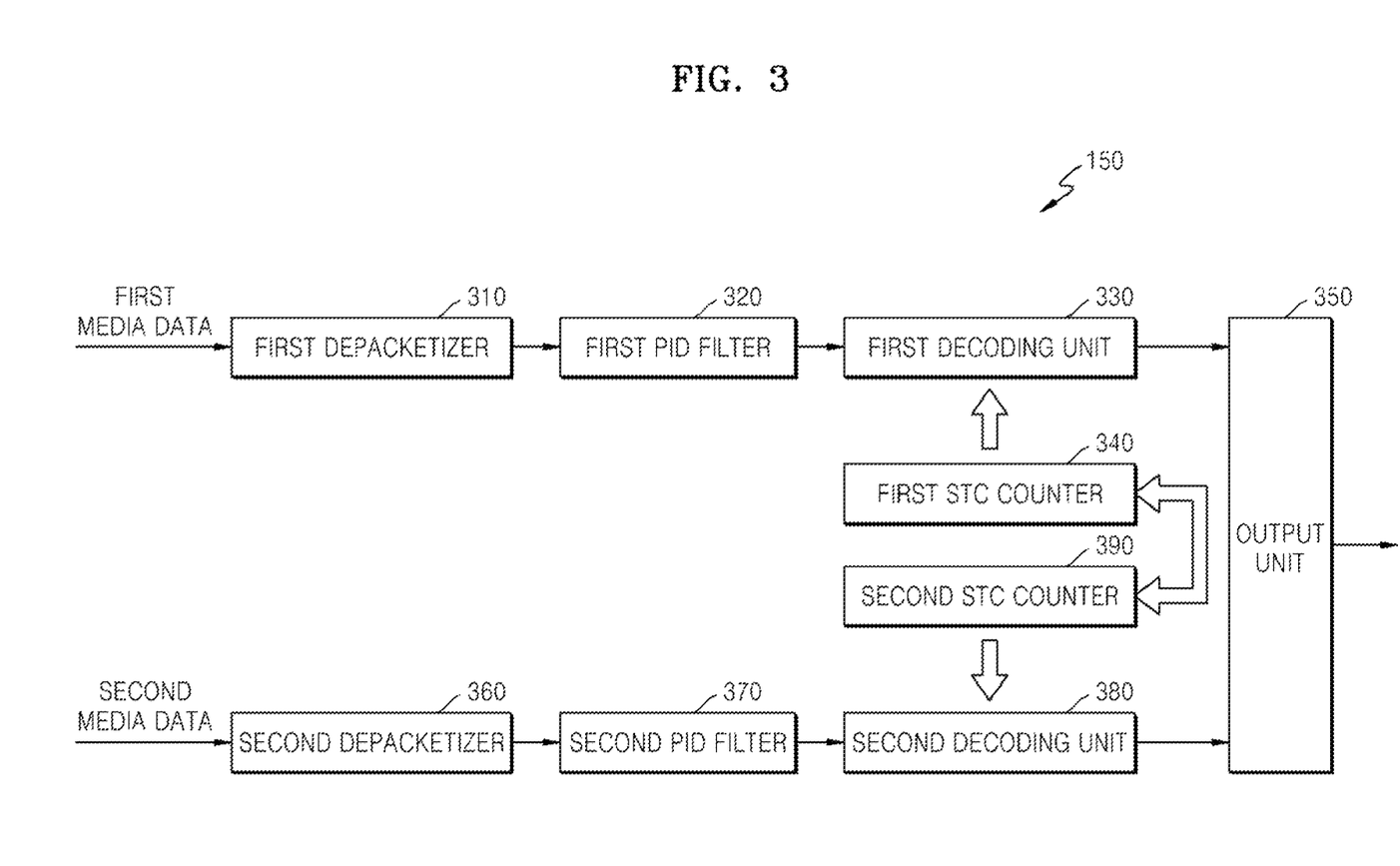
FIG. 3 is a block diagram of a playback unit of the decoding apparatus illustrated in FIG. 1.

FIG. 3 is a block diagram illustrating the playback unit 150 of the decoding apparatus 100 in greater detail. Referring to FIG. 3, the playback unit 150 includes first and second depacketizers 310 and 360, first and second Packet Identifier (PID) filters 320 and 370, first and second decoding units 330 and 380, first and second STC counters 340 and 390, and an output unit 350. The demodulation unit 140 demodulates the first and second media data modulated by the encoding apparatus (not shown) and sends the first media data to the first depacketizer 310 and the second media data to the second depacketizer 360. According to aspects of the present invention, the first media data may be main stream data (e.g., a main picture, a title video, etc.), and the second media data may be sub stream data (e.g., a sub-picture, etc.). Alternatively, the first media data may be sub stream data, and the second media data may be main stream data. The first depacketizer 310 depacketizes the first media data and sends the depacketized first media data to the first PID filter 320. The first PID filter 320 and the second PID filter 370 respectively demultiplex the first media data and the second media data, each of which includes received information about the DTS 210 and the PTS 220. Then, the first PID filter 320 and the second PID filter 370 send the demultiplexed first and second media data to the first decoding unit 330 and the second decoding unit 380, respectively. Although not shown in FIG. 3, the first media data and the second media data output by the first PID filter 320 and the second PID filter 370 may be buffered in buffers (not shown) before being received by the first decoding unit 330 and the second decoding unit 380. The first STC counter 340 and the second STC counter 390 control the values corresponding to moments when data packets of the first and second media data come into decoder buffers so that the values are equal to respective program clock reference (PCR) values of the data packets. In other words, the first STC counter 340 and the second STC counter 390 are initialized by respective PCR information included in the first media data and the second media data. The first STC counter 340 and the second STC counter 390 continue counting from the initial moments.

By setting the first STC counter 340 in this way, the first media data is input to the first decoding unit 330 at the time indicated by the DTS 210 included in the first media data and is then decoded thereby. The first decoding unit 330 includes a first video decoding unit (not shown) to decode video data, a subtitle decoding unit (not shown) to decode subtitle data such as a subtitle, an interactive graphic (IG) decoding unit (not shown) and/or a presentation graphic (PG) decoding unit (not shown) to decode an IG and/or a PG, and a first audio decoding unit (not shown) to decode audio data. The first decoding unit 330 decodes the first media data and sends the decoded first media data to the output unit 350 at the time of the PTS 220 included in the packet of the first media data.

Similarly, the second media data is input to the second decoding unit 380 at the time of the DTS 210 included in the second media data by the second STC counter 390. The second decoding unit 380 also includes a second video decoding unit (not shown) to decode video data, a subtitle decoding unit (not shown) to decode subtitle data such as a subtitle, an IG decoding unit (not shown) and/or a PG decoding unit (not shown) to decode an IG or a PG, and a second audio decoding unit (not shown) to decode audio data. The second decoding unit 380 sends the decoded second media data to the output unit 350 at the time of the PTS 220 included in the packet of the second media data. The output unit 350 blends the decoded video data with a subtitle and the like, outputs a result of the blending onto a screen, and mixes the decoded audio data and outputs a result of the mixing via a speaker (not shown).

In aspects of the present invention, it is assumed that the first media data and the second media data are independent. Accordingly, the first media data and the second media data are independently played back. Thus, the first media data and the second media data may start being played back at different points in time. A user can play back the first media data in a particular way, such as fast forwarding, rewinding, or slow playback, by using a user interface. When the user plays back the first media data in the trick play mode as described above, the second media data is played back according to a method preset by the user and/or a method preset in the decoding apparatus 100. A case where the first media data is being played back in the trick play mode, and the second media data is also played back together with the first media data in the trick play mode will be first described. When the user selects playback of the first media data in the trick play mode, the control unit 160 synchronizes the first STC counter 340 to provide a first clock signal to the first media data with the STC counter 390 to provide a second clock signal to the second media data. The synchronization of the first and second STC counters 340 and 390 is a synchronization of the first and second clock signals output by the first and second STC counters 340 and 390. Accordingly, the first and second STC counters 340 and 390 output the synchronized first and second clock signals. Thus, when the first media data is played back at double speed, the second media data is also played back at double speed.

While the first media data is being played back in the trick play mode, the decoding apparatus 100 may play back the second media data independently from the first media data. In this case, the control unit 160 independently operates the first STC counter 340 and the second STC counter 390. In other words, when a user commands the first media data to be played back in the trick play mode, the control unit 160 controls the first STC counter 340 to generate the first clock signal. The first decoding unit 330 performs decoding according to the first clock signal generated by the first STC counter 340. In this case, the second media data may be played back according to an original playback method. When the user selects playback of the first media data at double speed, while the second media data is being played back, the control unit 160 independently controls the first STC counter 330 and the second STC counter 390 so that the first media data can be decoded and played back at double speed and the second media data can be decoded and played back at the original playback speed.

While the first media data is being played back in the trick play mode, the decoding apparatus 100 may interrupt playback of the second media data. Specifically, when the user commands the first media data to be played back in the trick play mode, the control unit 160 controls the first STC counter 340 to play back the first media data in the trick play mode and the second STC counter 390 to not operate. In this case, the second STC counter 390 generates no clock signals. Since the second decoding unit 380 does not receive any clock signal from the second STC counter 390, the second decoding unit 380 does not decode the second media data and is paused at this point. While the first media data is being played back in the trick play mode, the decoding apparatus 100 may prevent the second media data from being played back on a screen. When the playback of the first media data in the trick play mode is concluded, the decoding apparatus 100 may output the second media data starting from a point at which a playback of the second media data was interrupted. For example, at the moment when playback of the first media data in the trick play mode is selected, the decoding apparatus 100 may generate a still image from the second media data that was being played back at that moment or may generate another screen. Specifically, when receiving a command to play back the first media data in the trick play mode from the user, the decoding apparatus 100 controls the first STC counter 340 to play back the first media data in the trick play mode and interrupt the playback of the second media data. At the moment when the playback of the second media data has been interrupted, the decoding apparatus 100 may generate the still image from the second media data that was being played back at that moment, and output the still image. When the playback of the first media data in the trick play mode is concluded, the decoding apparatus 100 may re-play back the second media data starting from the point at which the still image was generated.

Figure 4:
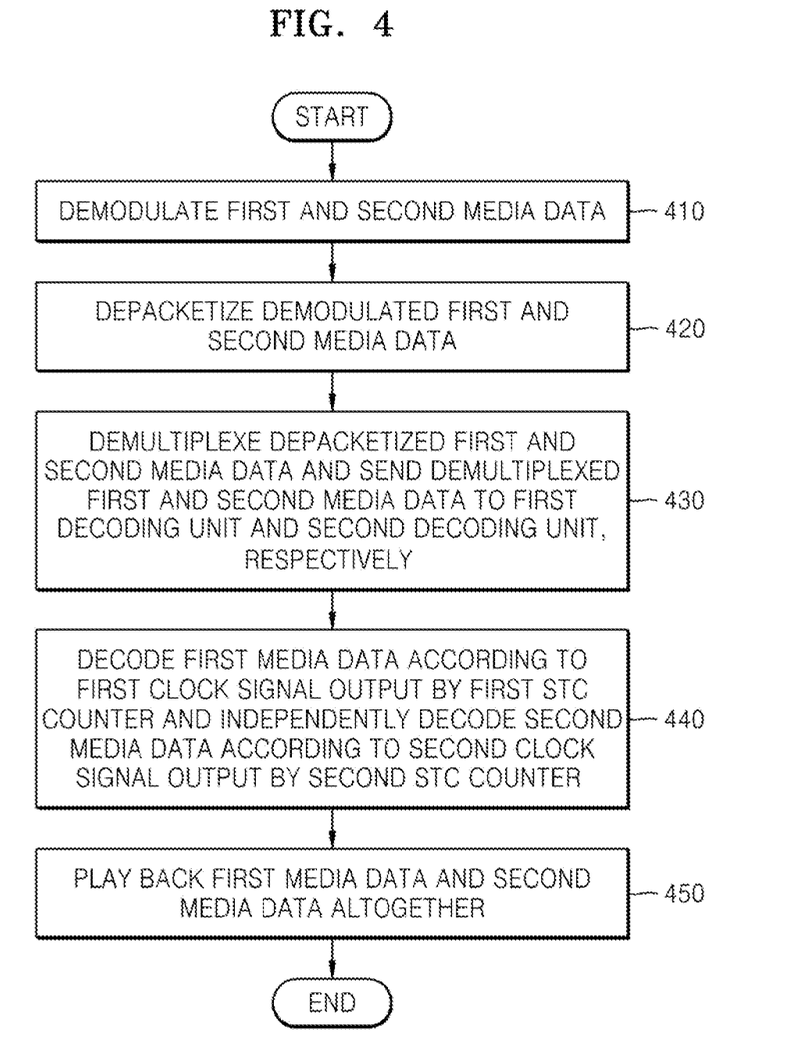
FIG. 4 is a flowchart of a playback method according to an embodiment of the present invention.

FIG. 4 is a flowchart of a playback method according to an embodiment of the present invention. Referring to FIG. 4, in operation 410, the decoding apparatus 100 reads the first media data and the second media data from the local storage 120 or the recording medium 170 and demodulates the read-out first and second media data. In operation 420, the decoding apparatus 100 depacketizes the demodulated first and second media data. In operation 430, the decoding apparatus 100 demultiplexes the depacketized first and second media data and sends the demultiplexed first and second media data to the first decoding unit 330 and the second decoding unit 380, respectively, according to the first clock signal and the second clock signal output by the first STC counter 340 and the second STC counter 390. In aspects of the present invention, the first media data and the second media data are independent from each other, and thus the first STC counter 340 and the second STC counter 390 are also independent from each other. In operation 440, the decoding apparatus 100 decodes the first media data according to the first clock signal output by the first STC counter 340 and independently decodes the second media data according to the second clock signal output by the second STC counter 390. In operation 450, the decoding apparatus 100 plays back the first media data and the second media data simultaneously.

Figure 5:
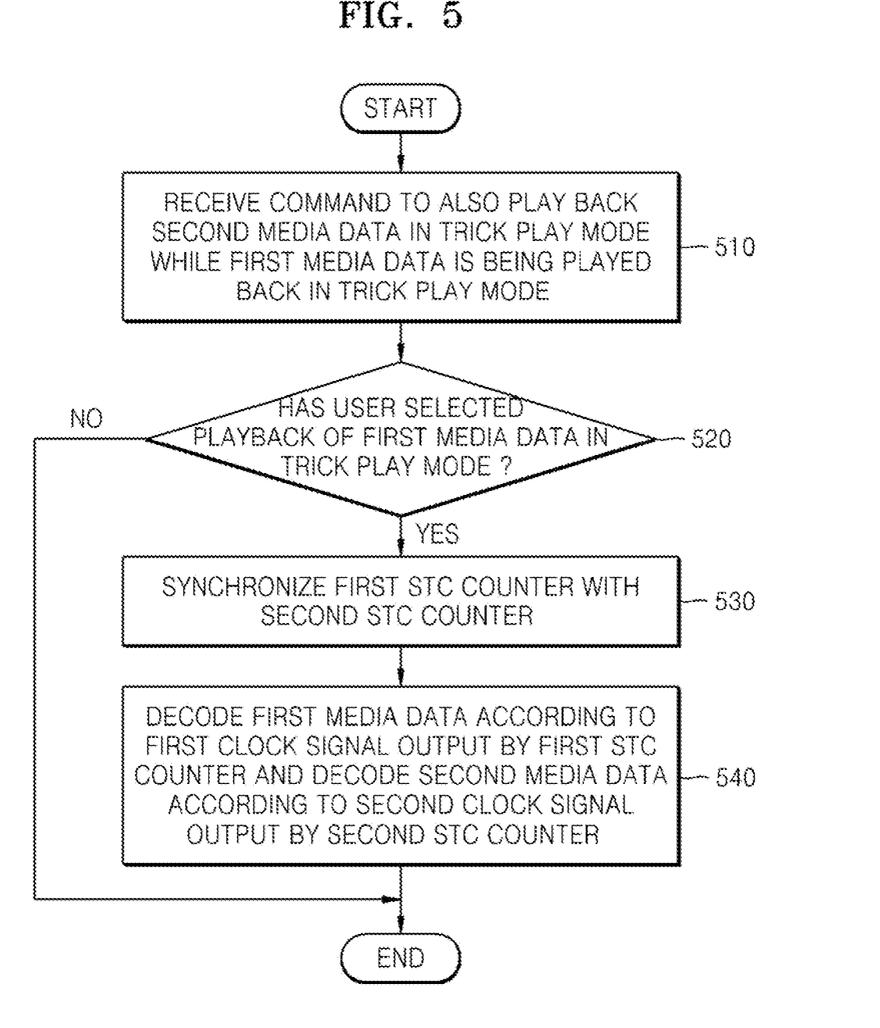
FIG. 5 is a flowchart of a playback method according to another embodiment of the present invention.

FIG. 5 is a flowchart of a playback method according to another embodiment of the present invention. Referring to FIG. 5, in operation 510, the decoding apparatus 100 receives a command from a user to play back the second media data in the trick play mode while the first media data is also being played back in the trick play mode. As described above, a method of playing back the second media data while the first media data is being played back in the trick play mode may be preset in the decoding apparatus 100, regardless of the selection of a user. In operation 520, the decoding apparatus 100 determines whether a user has selected playback of the first media data in the trick play mode through a user interface. When the playback of the first media data in the trick play mode has been selected, the decoding apparatus 100 synchronizes the first STC counter 340 with the second STC counter 390, in operation 530. When the first STC counter 340 and the second STC counter 390 are synchronized with each other (operation 530), the first clock signal output by the first STC counter 340 is synchronized with the second clock signal output by the second STC counter 390. In operation 540, the decoding apparatus 100 decodes the first media data according to the first clock signal output by the first STC counter 340 and decodes the second media data according to the second clock signal output by the second STC counter 390 synchronized with the first STC counter 340. In this case, the second media data is also played back in the same trick play mode together with the first media data.

Figure 6:
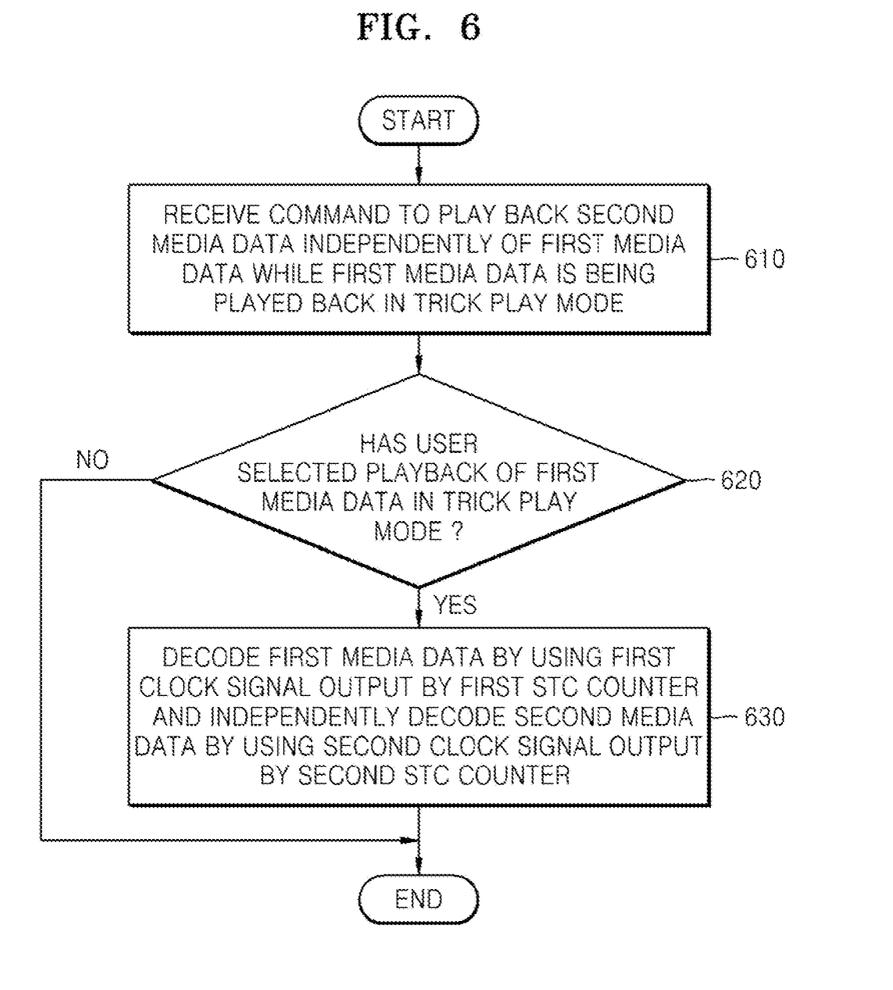
FIG. 6 is a flowchart of a playback method according to another embodiment of the present invention.

FIG. 6 is a flowchart of a playback method according to another embodiment of the present invention. Referring to FIG. 6, in operation 610, the decoding apparatus 100 receives a command from a user to play back the second media data independently of the first media data while the first media data is being played back in the trick play mode. In operation 620, the decoding apparatus 100 determines whether the user has selected playback of the first media data in the trick play mode. When the user has selected the playback of the first media data in the trick play mode, the decoding apparatus 100 decodes the first media data by using the first clock signal output by the first STC counter 340, and independently decodes the second media data by using the second clock signal output by the second STC counter 390, in operation 630.

Figure 7:
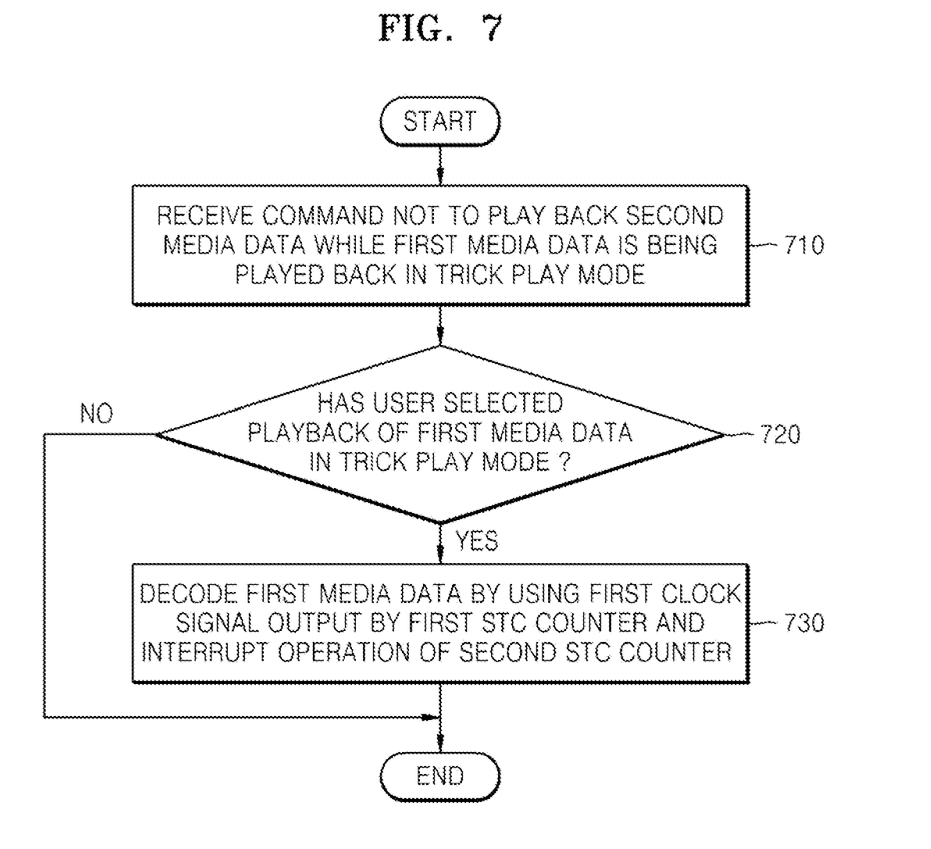
FIG. 7 is a flowchart of a playback method according to another embodiment of the present invention.

FIG. 7 is a flowchart of a playback method according to another embodiment of the present invention. Referring to FIG. 7, in operation 710, the decoding apparatus 100 receives a command from a user to not play back the second media data while the first media data is being played back in the trick play mode. In operation 720, the decoding apparatus 100 determines whether the user has selected playback of the first media data in the trick play mode. When the playback of the first media data in the trick play mode has been selected (operation 720), the decoding apparatus 100 decodes the first media data by using the first clock signal output by the first STC counter 340 and interrupts an operation of the second STC counter 390, in operation 730. In this case, the second STC counter 390 does not send the second clock signal to the second decoding unit 380, and thus the second media data cannot be decoded. Accordingly, the decoding apparatus 100 prevents the second media data from being played back while the first media data is being played back in the trick play mode. When the playback of the first media data in the trick play mode is concluded, the decoding apparatus 100 can re-output the second media data starting from a part that has been interrupted. In some cases, at the moment when playback of the first media data in the trick play mode has been selected, the decoding apparatus 100 may generate a still image from the second media data that is being played back and output the still image. When the playback of the first media data in the trick play mode is concluded, the decoding apparatus 100 may re-play back the second media data from a point at which the still image had been generated.

Aspects of the present invention provide a method and apparatus to play back a plurality of items of media data in various ways according to selections of a user, and a recording medium storing the method.

The reproducing method according to aspects of the present invention can also be embodied as computer readable codes on a computer readable recording medium to be implemented by at least one computer and/or processor. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of simultaneously playing back on an apparatus, implemented by a processor, first media data and second media data, independent from the first media data, the method comprising:

setting, by the processor, a playback manner of the second media data by using a user interface;

playing back the first media data and the second media data simultaneously, the first media data being played back by using a first clock signal output by a first system time clock (STC) counter, the second media data being played back by using a second clock signal output by a second STC counter;

playing back the first media data in a trick play mode when an instruction to play back the first media data in the trick play mode is received while playing back the first media data and the second media data simultaneously; and playing back the second media data according to the playback manner set via the user interface, while the first media data is played back in the trick play mode.

2. The method as claimed in claim 1, wherein:
the playing back of the first media data comprises:
depacketizing the first media data; and
decoding the depacketized first media data by using the first clock signal; and
the playing back of the second media data comprises:
depacketizing the second media data; and
decoding the depacketized second media data by using the second clock signal.

3. The method as claimed in claim 1, wherein the playing back of the second media data comprises not outputting the second media data to a display unit while the first media data is being played back in the trick play mode.

4. The method as claimed in claim 1, wherein:
the second clock signal is independent from the first clock signal.

5. The method as claimed in claim 1, wherein the playing back of the second media data comprises preventing the second STC counter from outputting the second clock signal to prevent a playback of the second media data while the first media data is being played back in the trick play mode.

6. The method as claimed in claim 5, wherein the playing back of the second media data further comprises:
interrupting an output of the second media data to a display unit while the first media data being played back in the trick play mode is output to the display unit; and
when the playing back of the first media data in the trick play mode is concluded, playing back the second media data from a point of the second media data at which the output of the second media data is interrupted.

7. The method as claimed in claim 5, wherein the playing back of the second media data further comprises:
generating a still image from a point of the second media data that is being played back when the first media data begins to be played back in the trick play mode;
playing back the still image while the first media data is being played back in the trick play mode; and
playing back the second media data from the point of the second media data at which the still image is generated, when the playing back of the first media data in the trick play mode is concluded.

8. The method as claimed in claim 1, wherein each media data includes video data, audio data, image data, text data, meta data, or any combination thereof.

9. The method as claimed in claim 1, wherein the trick play mode is fast forwarding, slow play back, fast reversing, or slow reverse.

10. The method as claimed in claim 1, wherein during the entire trick play mode, the first STC counter is independent of the second STC counter.

11. An apparatus configured to simultaneously play back first media data and second media data, independent from the first media data, the apparatus comprising:
a control unit implemented by a processor and configured to receive a command from a user interface unit;
a playback unit configured to play back the first media data and the second media data simultaneously;
a first system time clock (STC) counter configured to output a first clock signal in order to play back the first media data;
a second STC counter configured to output a second clock signal in order to play back the second media data; and
wherein the user interface unit is configured to instruct to play back the first media data in a trick play mode and set a playback manner of the second media data,
wherein the playback unit is configured to play back the first media data in the trick play mode when an instruction to play back the first media data in the trick play mode is received while playing back the first media data and the second media data simultaneously, and play back the second media data according to the playback manner set via the user interface unit, while the first media data is played back in the trick play mode.

12. The apparatus as claimed in claim 11, wherein the playback unit comprises:
a first depacketizer configured to depacketize the first media data;
a first decoding unit configured to decode the depacketized first media data by using the first clock signal;
a second depacketizer configured to depacketize the second media data; and
a second decoding unit configured to decode the depacketized second media data by using the second clock signal.

13. The apparatus as claimed in claim 11, wherein the playback unit does not output the second media data to a display unit while the first media data being played back in the trick play mode is output to the display unit.

14. The apparatus as claimed in claim 11, wherein:
the second clock signal is independent from the first clock signal.

15. The apparatus as claimed in claim 11, wherein the playback unit prevents the second STC counter from outputting the second clock signal to prevent playback of the second media data while the first media data is being played back in the trick play mode.

16. The apparatus as claimed in claim 15, wherein:
the playback unit interrupts an output of the second media data to a display unit while the first media data is being played back in the trick play mode; and
when a playback of the first media data in the trick play mode is concluded, the playback unit plays back the second media data from a point of the second media data at which the output of the second media data is interrupted.

17. The apparatus as claimed in claim 15, wherein the playback unit generates a still image from a point of the second media data that is being played back, when the first media data starts to be played back in the trick play mode, plays back the still image while the first media data is being played back in the trick play mode, and plays back the second media data from the point of the second media data at which the still image is generated, when the playback of the first media data in the trick play mode is concluded.

18. The apparatus as claimed in claim 11, wherein the first clock signal is independent from the second clock signal.

19. The apparatus as claimed in claim 11, further comprising:
a first decoding unit configured to decode the first media data according to the first clock signal; and
a second decoding unit configured to decode the second media data according to the second clock signal.

* * * * *